United States Patent [19]

Deutzmann

[11] 4,071,948

[45] Feb. 7, 1978

[54] APPARATUS FOR DISTRIBUTING ANNULAR WORKPIECES

[75] Inventor: Klaus Deutzmann, Langenfeld, Germany

[73] Assignee: Goetzewerke Friedrich Goetze AG, Burscheid, Germany

[21] Appl. No.: 672,972

[22] Filed: Apr. 2, 1976

[30] Foreign Application Priority Data

Apr. 2, 1975 Germany .............................. 2514297

[51] Int. Cl.² ................................................ B23Q 7/10
[52] U.S. Cl. ........................................ 29/809; 29/821; 10/155 A; 221/310
[58] Field of Search ............. 29/200 R, 200 H, 208 R, 29/211 R, 212 R, 809, 821; 221/310; 10/155 A

[56] References Cited

U.S. PATENT DOCUMENTS

| 1,385,086 | 7/1921 | Maranville | 29/212 R |
| 1,429,359 | 9/1922 | Maranville | 10/155 A |
| 1,822,099 | 9/1931 | Kmentt | 10/155 A |
| 2,073,396 | 3/1937 | Scholz | 29/212 R X |
| 2,583,700 | 1/1952 | Lyon | 221/310 X |
| 2,835,963 | 5/1958 | Drennan et al. | 29/211 R |
| 3,427,704 | 2/1969 | Banke | 29/211 R X |

Primary Examiner—Victor A. DiPalma
Attorney, Agent, or Firm—Spencer & Kaye

[57] ABSTRACT

For distributing annular workpieces onto a plate provided with a plurality of bolts protruding from the plate surface, each to hold and arrest a correctly positioned workpiece, there is provided a magazine which accommodates a plurality of workpieces in contact with one another at their peripheral surfaces, the magazine being inclined at an angle with respect to the plate surface, being relatively displaceable in the direction of its inclination parallel to the plate surface, and being provided at its lower end with a resilient holding device for the individual release of one workpiece at a time.

5 Claims, 2 Drawing Figures

APPARATUS FOR DISTRIBUTING ANNULAR WORKPIECES

BACKGROUND OF THE INVENTION

The present invention relates to an apparatus for distributing annular workpieces on a plate, the plate being provided with a plurality of bolts protruding from its surface to each accommodate and hold one workpiece in its desired position.

In order to economically mass produce relatively small vulcanized rubber objects, use is made of a vulcanizing tool which is adapted to the size of the vulcanizing press and is provided with a plurality of individual nests for the objects. For example, one such vulcanizing tool can be used to produce several hundred lip sealing rings of the type required to seal the valve shafts of internal- combustion engines.

While, due to the flowability of the raw rubber, the rubber material can be simply injected through channels and nozzles into the cavities of the nests for the objects, such sealing rings must have reinforcement rings of metal, for example, vulcanized into the rubber material and these reinforcement rings must be introduced into the cavities of the nests for the objects before the vulcanizing tool is closed. This is done by manual distribution of the metal pieces, which is extremely time consuming.

In order to prevent excessively long opening times for the vulcanizing tool, it has already been the practice to place the metal pieces onto a plate which serves as an auxiliary tool and which is provided with a number of rows of bolts protruding from the plate surface and arranged to correspond to the pattern of the nests, each bolt being provided to hold and arrest one respective annular metal piece. For example, by placing the corresponding vulcanizing tool plate onto the auxiliary plate provided with the metal pieces and then pivoting both plates by 180° it is possible to insert the metal pieces into the nests of the vulcanizing tool in a very short time. However, placement of the metal rings onto the auxiliary plate is itself a time consuming manual operation.

SUMMARY OF THE INVENTION

It is therefore an object of the present invention to reduce the time required for distributing the individual annular workpieces on the auxiliary plate, and thus to simplify the overall production process.

This object is accomplished, according to the present invention, by the provision of a magazine in which the workpieces are held so that their peripheral surfaces contact one another. This magazine is arranged at an angle to the auxiliary plate surface and is displaceable relative to the plate surface and parallel to the plate surface, the displacement of the magazine relative to the plate surface corresponding to the direction in which the magazine slopes away from the plate surface.

At its lower end the magazine is provided with a resilient holding device for the individual release of the lowermost workpieces. The magazine is predominantly a drop magazine in which the workpieces drop downwardly due to their own weight or, as in the present case, slide down. By displacing the drop magazine over the bolt plate in the direction toward the open side of the angle of inclination of the magazine, the bolts of the plate engage from below into the bores of the lowermost annular workpieces which partially protrude from the lower end of the drop magazine and pull them out of the magazine shaft with simultaneous release by the holding device so that successive workpieces are placed around successive bolts on the plate surface with each workpiece being centered on its respective bolt.

If it is assumed that, for optimum coverage of an area, the nests in the vulcanizing tool, and thus the bolts of the auxiliary plate, will be arranged in rows, it is advisable to divide the drop magazine into a plurality of individual magazines, each individual magazine being associated with a respective row of bolts. Preferably the individual magazines should lie in a common plane.

A particularly simple embodiment is constituted by an inclined base plate provided with parallel partitions extending in the direction of inclination to define magazine shafts. The inner width of each shaft is selected to correspond to the outer diameter of the workpieces. The length of the individual magazines should always be made at least long enough so that a sufficient number of workpieces to cover one row of bolts on the auxiliary plate can be held ready. It is also of advantage to cover the upper side of the magazine, opposite the base plate of the magazine, with a transparent plate in order to prevent workpieces from falling out of the magazine guides, on the one hand, and simultaneously to permit optical monitoring of the magazine contents.

In further accordance with the invention, the lower edge of the magazine base plate is provided with recesses centered between successive partitions and having a width which is slightly greater than the diameter of the bolts so that, as the auxiliary plate is displaced, the upper ends of the bolts can pass through the recesses and can thus reach the bore of the lowermost workpiece with greater ease.

Resilient holding devices are preferably provided in the form of resilient holding clamps which may be composed of pairs of bent spring wires capable of being pressed apart to the sides, i.e. spread apart, when the lowermost workpiece is pulled out of the individual magazine.

The workpieces are fed onto the inclined magazine base plate in the region above the individual magazines by means of known feed devices which simultaneously supply the workpieces in a defined position. In order to distribute the workpieces to the individual magazines, the upper ends of the partitions can be made laterally movable between the individual magazines and/or they can be pivotally mounted in order to, on the one hand, prevent excess accumulations of workpieces or the formation of bottlenecks, respectively, at the entrance of each individual magazine by a pivoting movement of the ends of the partitions and, on the other hand, permit movement of the workpieces in lateral directions from completely filled individual magazines to partially filled individual magazines so that all individual magazines become filled completely. In order to aid such manipulations, air nozzles may be provided in the base plate in front of the entrances of the individual magazines so as to assist the movement of the workpieces by jets of compressed air.

DESCRIPTION OF THE PREFERRED EMBODIMENTS

Figure 1:
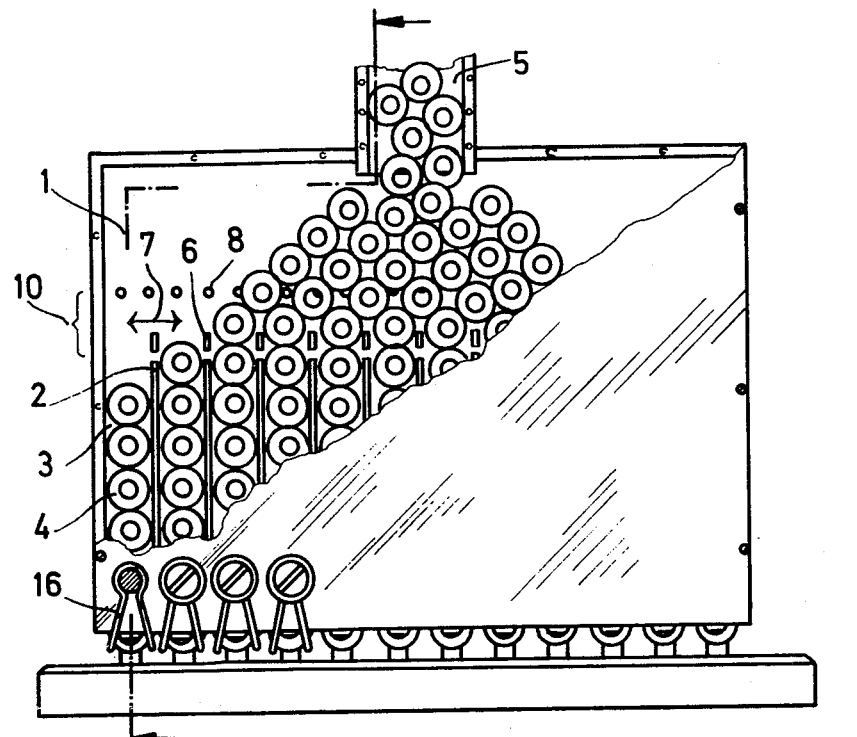
FIG. 1 is a front view of a preferred embodiment of the invention, with a portion of the magazine cover plate broken away to allow the interior of the magazine to be seen.
Figure 2:
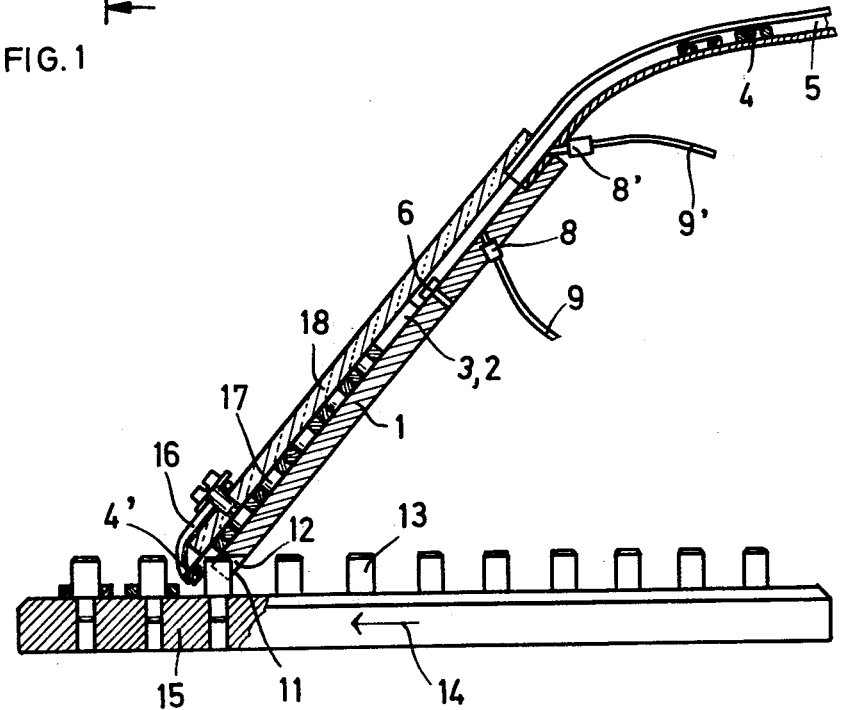
FIG. 2 is a cross sectional view of the apparatus of FIG. 1, taken along line 2—2 of FIG. 1.

The apparatus shown in FIGS. 1 and 2 includes a magazine base plate 1 which is inclined, for example, by 45° and has protruding partitions 2 which form individual magazines, or guides, 3 to accommodate annular workpieces 4 which contact one another at their peripheral surfaces. The introduction of the workpieces 4 is effected centrally above the individual magazine guides 3 via workpiece guide 5 by means of commercially available feeder devices which are not shown. In order to distribute the workpieces to the individual magazine guides 3, the upper ends 6 of the partitions 2 are mounted to be laterally movable in the directions of arrows 7. Upper ends 6 can, additionally or alternatively, be mounted to undergo pivotal movement. The mechanism for imparting such lateral and pivotal movement to ends 6 can be constructed in any suitable, known manner and is not shown.

Magazine base plate 1 is additionally provided with nozzles 8 and 8' through which compressed air is conducted via lines 9 and 9'. By directed oblique placement of the outlet ends of the compressed air nozzles 8 and 8', and in conjunction with the lateral movements of the partition ends 6, the workpieces 4 can be moved downwardly, upwardly and laterally in the guide entrance region 10. This assures rapid distribution of the workpieces 4 to all of the individual magazine guides 3.

Recesses 12 are provided in the lower edge 11 of magazine base plate 1, one such recess being centered with respect to each individual magazine guide 3. These recesses are provided to receive the upper ends of bolts 13 of auxiliary plate 15 as the plate travels below and relative to the individual magazines 3 along the direction in which magazine base plate 1 extends toward plate 15 as shown by arrow 14.

The direction of relative movement indicated by arrow 14

The direction of relative movement indicated by arrow 14 is parallel to the surface of plate 15 from which bolts 13 protrude. Of course, such relative movement can be produced by moving either the magazine or the auxiliary plate while holding the other stationary, or by moving both members, the only limitation being that the movement of plate 15 relative to the magazine be in the direction of arrow 14.

Pairs of holding clamps 16 of spring wire serve to normally close off the individual magazine guides 3 at their bottom and each of these clamps 16 is spread laterally apart, as a bolt 13 accepts the lowermost workpiece 4' associated therewith, by a force applied by such workpiece after it engages the bolt. Each clamp 16 is arranged so that the lowermost workpiece 4' in its associated guide 3 will protrude from the guide by about one-half of its diameter before engaging a bolt. This assures engagement of bolts 13 in bores 17 of the annular workpieces 4.

The side of the magazine opposite the magazine base plate 1 is covered by means of a transparent plate 18 to prevent workpieces from falling out while permitting optical control of the interior of the magazine.

With the above-described apparatus it is possible to place several hundred workpieces onto an auxiliary plate provided with holding bolts automatically and in the shortest possible time in order to subsequently place them, for example, simultaneously and in an aligned arrangement into the nests of a vulcanizing tool.

It will be understood that the above description of the present invention is susceptible to various modifications, changes and adaptations, and the same are intended to be comprehended within the meaning and range of equivalents of the appended claims.

What is claimed is:

1. Apparatus for distributing annular workpieces onto a plate provided with a plurality of bolts protruding from one surface of the plate, each bolt being arranged to arrest and hold a respective workpiece in proper position, said apparatus comprising: a drop magazine composed of a plurality of individual magazines each for accommodating a plurality of the workpieces with adjacent workpieces in contact with one another at their peripheral surfaces, said individual magazines each having a workpiece inlet end and a workpiece outlet end and all being arranged adjacent one another in a common plane, said drop magazine being oriented at an angle to the one plate surface, and being displaceable relative to the plate in that direction parallel to the one plate surface which corresponds to the direction of inclination of said magazine away from the one plate surface, said drop magazine further including partition means delimiting said individual magazines and separating said individual magazines from one another, said partition means including, at the workpiece inlet ends of said individual magazines, partition members which are pivotal and movable laterally of the length of said individual magazines; and resilient holding means mounted at the end of said drop magazine adjacent the one plate surface for effecting individual release of successive workpieces onto successive bolts.

2. An arrangement as defined in claim 1 wherein said drop magazine comprises an inclined base plate, and said individual magazines extend in the direction of inclination of said base plate and constitute workpiece guides having a width corresponding to the outer diameter of the workpieces.

3. An arrangement as defined in claim 2 wherein the lower edge of said base plate is provided with a plurality of recesses each centered with respect to a respective individual magazine and each having a width which is greater than the diameter of the bolts.

4. An arrangement as defined in claim 1 wherein said drop magazine comprises a base plate and further comprising air nozzles extending through said base plate into the region above the workpiece inlet ends of said individual magazines.

5. An arrangement as defined in claim 1 further comprising means defining a single workpiece supply source connected for supplying workpieces to the workpiece inlet ends of all of said individual magazines.

* * * * *